United States Patent
Wu et al.

(10) Patent No.: US 9,143,007 B2
(45) Date of Patent: Sep. 22, 2015

(54) ACTIVE POWER MANAGEMENT ARCHITECTURE AND MANAGING METHOD THEREOF

(75) Inventors: Chien-Lung Wu, Taoyuan Hsien (TW); Chih-Chiang Chan, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 657 days.

(21) Appl. No.: 13/371,731

(22) Filed: Feb. 13, 2012

(65) Prior Publication Data

US 2013/0020868 A1 Jan. 24, 2013

(30) Foreign Application Priority Data

Jul. 20, 2011 (TW) .............................. 100125592 A (51) Int. Cl.
*H02J 4/00* (2006.01)
*H02J 13/00* (2006.01)
*G06F 1/26* (2006.01)

(52) U.S. Cl.
CPC .............. *H02J 13/0082* (2013.01); *G06F 1/26* (2013.01); *Y02B 90/2615* (2013.01); *Y02B 90/2669* (2013.01); *Y04S 40/121* (2013.01); *Y04S 40/128* (2013.01); *Y10T 307/305* (2015.04)

(58) Field of Classification Search
CPC ... H02J 13/0082; G06F 1/26; Y02B 90/2615; Y02B 90/2669; Y04S 40/128; Y04S 40/121
USPC .............................. 307/18; 700/286, 297, 298
See application file for complete search history.

(56) References Cited

U.S. PATENT DOCUMENTS

| | | | |
|---|---|---|---|
| 6,711,613 B1* | 3/2004 | Ewing et al. .................. | 709/223 |
| 2004/0257237 A1 | 12/2004 | Bialecki, Jr. et al. | |
| 2007/0140238 A1* | 6/2007 | Ewing et al. .................. | 370/389 |
| 2008/0030947 A1* | 2/2008 | Behrens et al. .............. | 361/686 |
| 2008/0068141 A1 | 3/2008 | Yokomitsu et al. | |
| 2010/0019575 A1* | 1/2010 | Verges ............................ | 307/38 |
| 2010/0145542 A1* | 6/2010 | Chapel et al. ................ | 700/295 |
| 2011/0167280 A1* | 7/2011 | Ewing et al. .................. | 713/300 |
| 2011/0187193 A1* | 8/2011 | Pan et al. ........................ | 307/39 |
| 2011/0218689 A1* | 9/2011 | Chan et al. .................... | 700/295 |

\* cited by examiner

Primary Examiner — Kenneth M Lo
Assistant Examiner — Derrick Boateng
(74) Attorney, Agent, or Firm — Kirton McConkie; Evan R. Witt (57) ABSTRACT

Disclosed in an active power management architecture, including a remote power management system having a database; a power distribution unit communicated with the remote power management system through an internal network; a plurality of electronic devices each includes a power supply unit; and a plurality of transmission cables respectively connected to the power distribution unit and the power supply units of the electronic devices for outputting power of the power distribution unit to the power supply units. The information of the power supply units is transmitted from the power supply units to the power distribution unit through the transmission cables in compliance with a power line communication protocol, and the power distribution unit is configured to transmit the information to the database, such that the remote power management system gives an instruction to the power distribution unit to control the power distribution unit and the power supply units.

16 Claims, 7 Drawing Sheets

ACTIVE POWER MANAGEMENT ARCHITECTURE AND MANAGING METHOD THEREOF

FIELD OF THE INVENTION

The present invention is related to a power management architecture and the managing method thereof, and more particularly to an active power management architecture and the managing method thereof for data centers in a cloud computing system.

BACKGROUND OF THE INVENTION

With the progress of computer technology and the rapid growth of Internet, the service or utility rendered by the Internet is mushrooming. Therefore, the cloud computing systems consisted of a number of computers and data centers are increasing. In order to allow the data center to provide more services or utilities over the Internet, the number of the computer or server of the data center has to be increased. As a result, the problems arising from the power supply and the power distribution as well as the power management of the data center is forthcoming. In order to meet the demands of power supply, distribution and management for the data center, the data center uses power distribution units to distribute the required power for each computer or server. Furthermore, a remote power management system is employed to manage each power distribution unit to check whether each power distribution unit supplies the required power for the computers or servers, thereby optimizing the power efficiency for the data center.

Figure 1:
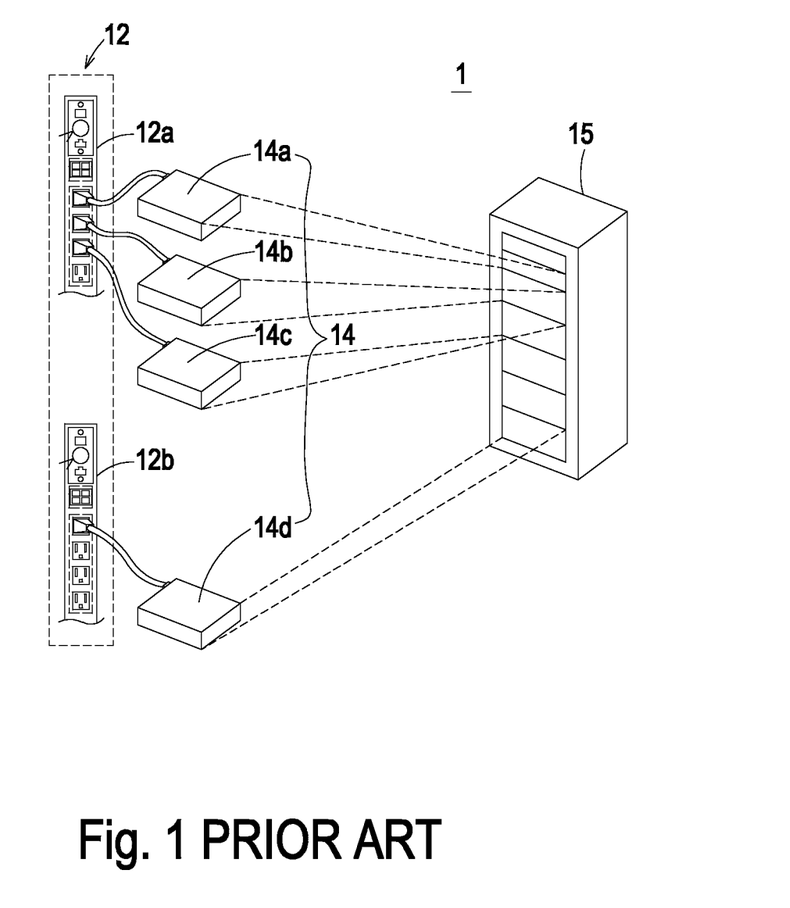
FIG. 1 shows the systematic architecture of a conventional power management architecture for data centers.

Referring to FIG. 1, in which the systematic architecture of a conventional power management architecture for data centers is shown. As shown in FIG. 1, the conventional power management architecture for data centers 1 employs a remote power management system to manage the operation of the computers or servers 14 connected to the power distribution units 12. The computer or servers 14a-14d of the data center is stacked on a cabinet 15. Each data center includes a plurality of cabinets. Thus, a cloud computing system consisted of computers or servers 14a-14d is formed. As shown, each computer or server 14a-14d is connected to a corresponding power distribution unit 12a, 12b. However, each power distribution unit 12 may be connected to two or more computers or servers 14a-14d. For example, the power distribution unit 12a includes a plurality of outlets. Hence, the power distribution unit 12a may be connected to a plurality of computers or servers 14b, 14c in addition to a corresponding computer or server 14a. Each outlet of the power distribution unit 12 includes a switch element (not shown). With the switching operation of the switch elements, the power management, distribution and control of the computers or servers 14a-14d can be implemented.

Figure 2:
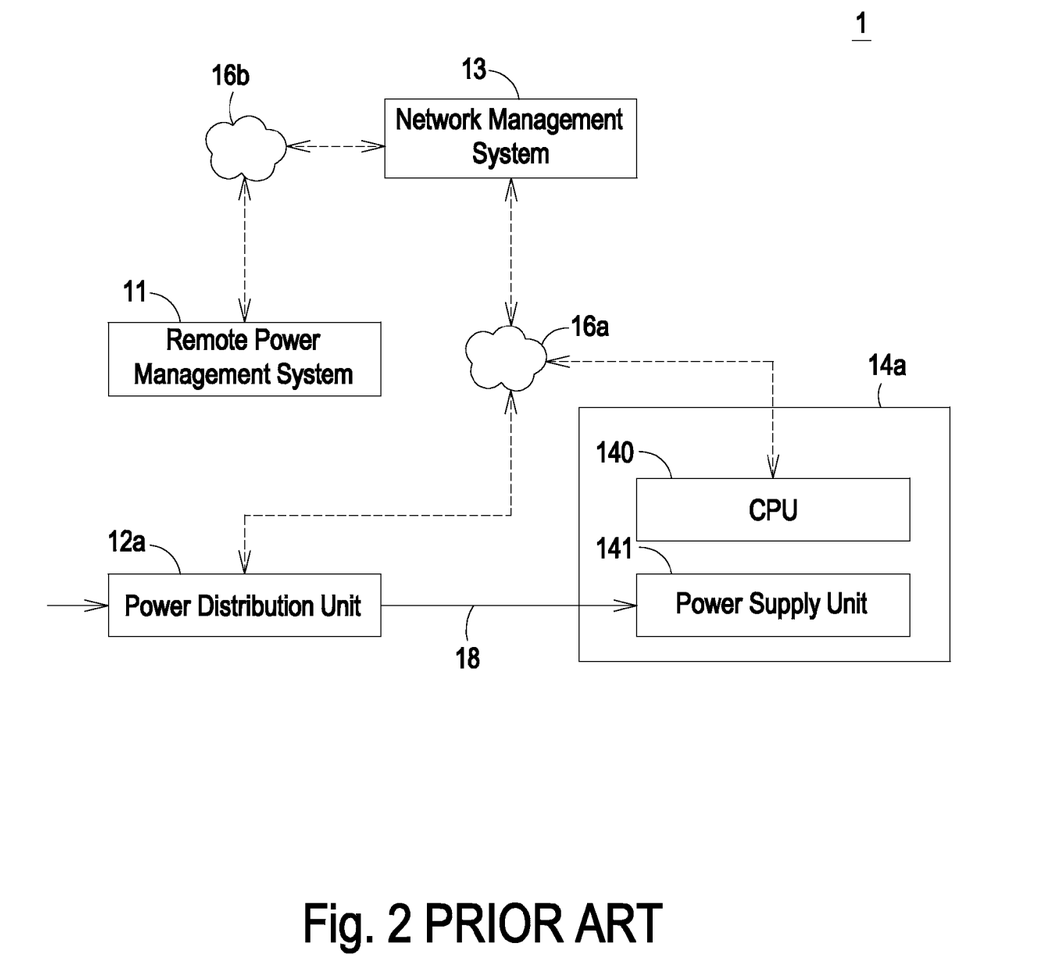
FIG. 2 is a block diagram showing the power management and information transmission architecture of a conventional data center.

FIG. 2 is a block diagram showing the power management and information transmission architecture of a conventional data center. As shown in FIG. 1 and FIG. 2, each computer or server 14a-14d includes a central processing unit (CPU) 140 and a power supply unit 141. The CPU 140 of the computer or server 14a is connected to the network management system 13 through a first external network 16a. The network management system 13 is connected to the remote power management system 11 through a second external network 16b. On the other hand, the power distribution unit 12a is connected to the remote power management system 11 through the same network channel and is remotely controlled by the remote power management system 11. Each power distribution unit 12 is connected to the power supply unit in the corresponding computer or server 14a-14c through the cable 18 for supplying power to the corresponding computer or server 14a-14c.

Generally, the power supply unit 141 will actively and periodically detect the power consumption information or the energy consumption information of the computer or server 14. For example, the power supply unit 141 will actively and periodically detect the information about the output power, power consumption, power supplying status of each outlet and the information about the input voltage, input current, and the power consumption of the power supply unit 141. Next, the information is transmitted to the network management system 13 by the computer or server 14 through the first external network 16a. The network management system 13 will transmit these power status information to the remote power management system 11 through the second external network 16b, so that the remote power management system 11 can periodically receive the power status information of each computer or server 14 and remotely control the power distribution units 12a, 12b through the same network channel. Therefore, the remote power management system 11 can management the overall power usage.

However, each computer or server 14 is configured to connect to the remote power management system 11 and transmit information to the remote power management system 11 through the same data transmission channel. Hence, the larger data stream will congest the network channel and affect the data transmission speed. Also, when the computer or server 14 is under the normal operating mode, if the first external network 16a or the second external network 16b is congested or inaccessible, the remote power management system 11 can not acquire the information of each computer or server 14a-14d through the network channel and can not control the power distribution units 12a, 12b. Furthermore, when the remote power management system 11 can not acquire the information of the computer or server 14 through the network channel, it is required to detect and confirm if the network is inaccessible or the computer or server 14 is malfunctioned, impaired, or crashed. This would disturb the operator of the remote power management system 11.

More disadvantageously, if one of the computers or servers 14 in the data center is malfunctioned, impaired, or crashed, the remote power management system 11 can only ascertain which computer or server 14 did not transmit data without the ability of ascertaining which computer or server 14 is problematic and the address of the problematic computer or server 14, as the conventional power management architecture 1 does not provide the function of positioning and addressing. When it is desired to repair or reboot the malfunctioned, impaired, or crashed computer or server 14, it is required for the operator to move to the data center and inspect the computers or servers 14 in the cabinet 15, so as to find out the malfunctioned, impaired, or crashed computer or server 14 for repair or reboot. As the number of the computers or servers 14 in each data center is large and the conventional power management architecture is incapable of providing the function of positioning and addressing and incapable of rebooting the computers or servers 14 automatically, the operator or maintainer of the power management system will be bothered by the complex repair operation and wasted inspection and repair time and cost.

SUMMARY OF THE INVENTION

An object of the invention is to provide an active power management architecture and the managing method thereof that use an internal network and a two-way communication channel set up on transmission cables as well as the power line communication technique to obtain the power consumption information of power distribution units and power supply units of corresponding electronic devices. Thus, the active power management architecture can compare and analyze the information to make determinations and response, thereby giving instructions to the power distribution units to accomplish the power management for power distribution units and the power supply units connected therewith without the need of an external network.

Another object of the invention is to provide an active power management architecture and the managing method thereof for providing the positioning and addressing function and capable of actively rebooting the electronic devices, thereby enhancing the convenience of power management operation and lower the time and cost incurred with power management operation.

Another broader aspect of the invention is to provide an active power management architecture, which includes a remote power management system having a database; at least one power distribution unit communicated with the remote power management system through an internal network; a plurality of electronic devices, each of which includes a power supply unit; and a plurality of transmission cables respectively connected to the at least one power distribution unit and the power supply units of the electronic devices for outputting power of the at least one power distribution unit to the power supply units. The information of the power supply units is transmitted from the power supply units to the at least one power distribution unit through the transmission cables in compliance with a power line communication protocol, and the at least one power distribution unit is configured to transmit the information to the database of the remote power management system, such that the remote power management system gives an instruction to the at least one power distribution unit to control the at least one power distribution unit and the power supply units.

Another broad aspect of the invention is to provide an active power management method, which includes the steps of (a) providing a remote power management system, at least one power distribution unit, a plurality of electronic devices, and a plurality of transmission cables, wherein the at least one power distribution unit is connected to a plurality of power supply units of the electronic devices through the transmission cables; (b) transmitting information of the power supply units from the power supply units to the at least one power distribution unit through the transmission cables in compliance with a power line communication protocol; (c) transmitting the information from the at least one power distribution unit to a database of the remote power management system; (d) actively giving an instruction to the at least one power distribution by the remote power management system; and (e) in response to the instruction, controlling and managing the power supply units of the electronic devices.

Another yet aspect of the invention is to provide an active power management architecture, which includes a remote power management system having a database; a plurality of power distribution units; at least one local power management unit connected to the remote power management system through an internal network and connected to the power distribution units for performing a local power management and control operation; a plurality of electronic devices, each of which includes a power supply unit; and a plurality of transmission cables respectively connected to the power distribution units and the power supply units of the electronic devices for outputting power of the power distribution units to the power supply units. The information of the power supply units is transmitted from the power supply units to the power distribution units through the transmission cables in compliance with a power line communication protocol, and the power distribution units are configured to transmit the information to the database of the remote power management system through the at least one local power management unit, such that the remote power management system gives an instruction to the power distribution units to control the power distribution units and the power supply units.

Now the foregoing and other features and advantages of the present invention will be best understood through the following descriptions with reference to the accompanying drawings, wherein:

DESCRIPTION OF THE PREFERRED EMBODIMENT

Figure 3:
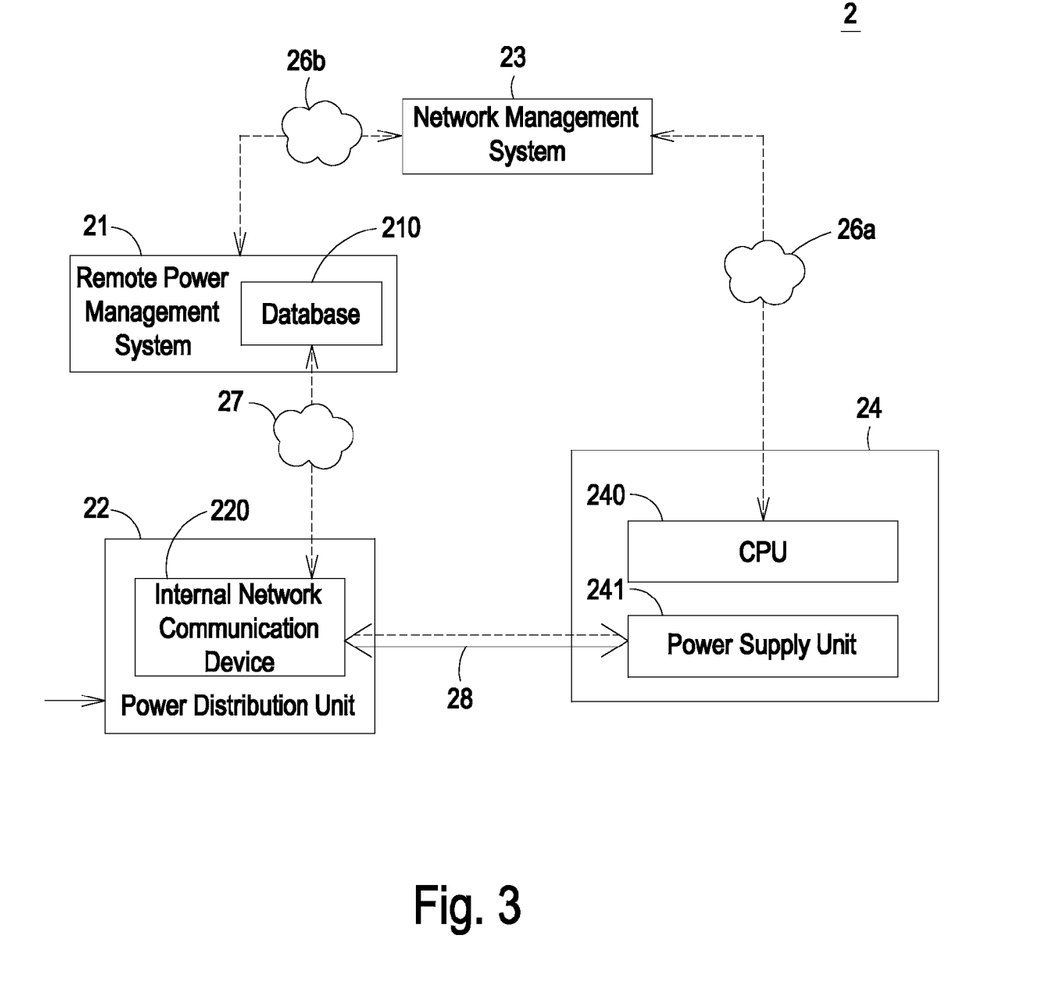
FIG. 3 a block diagram showing the power management and information transmission architecture of a data center according to a preferred embodiment of the invention.

FIG. 3 is a block diagram showing the power management and information transmission architecture of a data center according to a preferred embodiment of the invention. The inventive power management architecture 2 includes a remote power management system 21, at least one power distribution unit 22, a plurality of transmission cables 28, and a plurality of electronic devices 24. To simplify the illustration of the invention, the inventive power management architecture 2 of FIG. 3 includes a remote power management system 21, a power distribution unit 22, a transmission cable 28, and an electronic device 24. In this embodiment, the remote power management system 21 is used to manage and control the power supply of the electronic device 24. The power distribution unit 22 is used to communicate with the remote power management system 21 by an internal network 27. The transmission cable 28 is connected to the power distribution unit 22 and the power supply unit 241 of the electronic device 24, respectively, for supplying the electric power outputted by the power distribution unit 22 to the power supply unit 241 and proceeding with two-way communication with the power supply unit 241. The power distribution unit 22 includes a plurality of outlets for allowing the electronic device 24 to be connected therewith through the transmission cable 28. Therefore, the power distribution unit 22 can be connected to a plurality of electronic devices 24 and receive the instructions of the remote power management system 21, thereby controlling and distributing the power supply of the electronic device 24.

In this embodiment, the electronic device 24 may be a computer or a server. Each electronic device 24 includes a CPU 240 and a power supply unit 241. The CPU 240 is used to control the operation of the electronic device 24 and proceed with arithmetic operations. The power supply unit 241 is connected to the power distribution unit 22 through the transmission cable 28 for supplying electric power to the electronic device 24. Also, the CPU 240 may communicate with the power supply unit 241 through an internal communication wiring (not shown). The CPU 240 of the electronic device 24 is connected to and communicated with the network management system 23 through a first external network 26a. The network management system 23 is connected to and communicated with the remote power management system 21 through a second external network 26b. Therefore, the remote power management system 21 can acquire the power consumption information about the power usage, such as the output power of the power supply unit 241 and the power consumption, through the external data transmission channel consisted of the first external network 26a and the second external network 26b. Also, the remote power management system 21 can give an instruction to the power distribution unit 22 according to the acquired information for managing and controlling the power distribution unit 22.

According to the invention, the remote power management system 21 can communicate with the electronic device 24 through the aforementioned external data transmission channel. Also, the remote power management system 21 can actively acquire the power consumption information of the power supply unit 241 of the electronic device 24 through the internal data transmission channel consisted of the internal network 27, the power distribution unit 22, and the transmission cable 28. The power consumption information of the power supply unit 241 is transmitted by the power supply unit 241 to the power distribution unit 22 through the transmission cable 28 in compliance with the power line communication protocol. The power distribution unit 22 can transmit the power consumption information of the power supply unit 241 to the database 210 of the remote power management system 21, thereby allowing the remote power management system 21 to actively give an instruction to the power distribution unit 22 through the internal data transmission channel for controlling the power distribution unit 22 and the power supply unit 241.

For example, the power distribution unit 22 can periodically detect the real-time power consumption information of the power supply unit 241 of the electronic device 24 by a specific protocol in a manual manner or in an automatic manner. When the remote power management system 21 acquires the information transmitted by the power distribution unit 22 through the internal network 27, the acquired information will be compared and analyzed with the parameters in the database 210, thereby making determination and response. Afterwards, the instruction is given to the power distribution unit 22 to allow the power distribution unit 22 to manage and control the power of the electronic device 24 according to the instruction, thereby achieving the goal of performance management. In this way, the remote power management system 21 can rapidly and efficiently acquire the real-time power consumption information of each electronic device 24 through the internal data transmission channel consisted of the internal network 27, the power distribution unit 22, and the transmission cable 28, and carry out power management and control to the power distribution unit 22 and the power supply unit 241 through the internal data transmission channel. As the inventive active power management architecture 2 can use different data transmission channel to carry out data transmission, the limitations of transmission quantity and transmission time on the external network can be lifted. Thus, the information can be accessed more conveniently and more stably. Also, the remote power management system 21 can acquire the ID code of the power supply unit 241 through the internal data transmission channel or the external data transmission channel when the power supply unit 241 is initially installed in the electronic device 24, and record the acquired ID code in the database 210. Hence, the remote power management system 21 can accomplish the positioning operation to the electric device 24 according to the ID code. Also, the remote power management system 21 can regulate the power distribution operation or power management and control operation according to the acquired information and/or a control policy, so as to promote the overall power management efficiency and the stability and reduce the cost in connection with power management.

Figure 4:
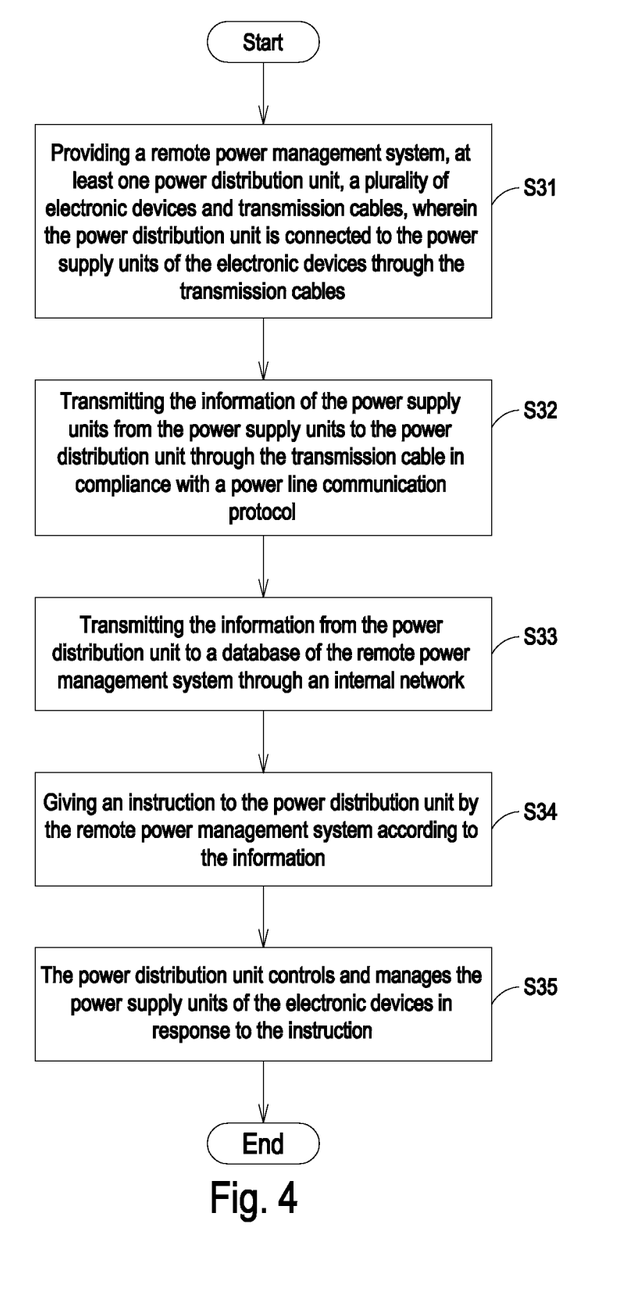
FIG. 4 is a flow chart illustrating the active power management method according to the invention.

Referring to FIGS. 3 and 4, in which FIG. 4 is a flow chart illustrating the active power management method according to the invention. The inventive active power management method is described as follows. First, at the step S31, a remote power management system 21, at least one power distribution unit 22, a plurality of electronic devices 24, and a plurality of transmission cables 28 are provided. The power distribution unit 22 is connected to the power supply units 241 of the electronic devices 24 through the transmission cables 28. Next, at the step S32, the power distribution unit 22 can actively and periodically detect the information of the power supply units 241 of the electronic devices 24, such as the network address of the electronic devices 24, the input power of the power supply units 241, and the power consumption of the power supply units 241. The information is transmitted from the power supply units 241 of the electronic devices 24 to the power distribution unit 22 through the transmission cables 28. At this step, the information of the power supply units 241 is transmitted from the power supply units 241 to the power distribution unit 22 by a power line communication protocol through the transmission cables 28. Next, at the step S33, the power distribution unit 22 transmits the information to the database 210 of the remote power management system 21 through an internal network 27. When the remote power management system 21 acquires the information of the electronic devices 24 through the internal data transmission channel, the remote power management system 21 compares and analyzes the information with the parameters in the database 210 and in response to the comparison and analysis makes determination and response, as shown in step S34. Thus, an instruction is given actively to the power distribution unit 22 for controlling the power distribution unit 22. Finally, at the step S35, when the power distribution unit 22 receives the instruction from the remote power management system 21, the power distribution unit 22 can carry out power control and performance management to the power supply units 241 of the electronic devices 24 in response to the instruction.

In this embodiment, the power distribution unit 22 includes an internal network communication device 220 for allowing the power distribution unit 22 to communicate with the remote power management system 21. The internal network communication device 220 may include a wired network communication interface or a wireless network communication interface. The internal network communication device 220 is used to accomplish the power line communication between the power distribution unit 22 and the power supply units 241.

With the two-way communication between the power distribution unit 22 and the transmission cables 28 over the internal network 27, each electronic device 24 can actively transmit its status information and power consumption information through the power distribution unit 22 and can control the ON/OFF status of each outlet thereof. Also, the remote power management system 21 can remotely monitor and management each power distribution unit 22 and the power supply units 241 of the electronic devices 24 connected therewith. If one of the electronic devices 24 is operating abnormally, e.g. if one of the electronic devices 24 is crashed and the information transmission is abnormal or faulty, the remote power management system 21 can compare and analyze the received abnormal information with the parameters or control policy in the database 210, and in response thereto giving an instruction to the power distribution unit 22. Thus, the abnormal electronic device 24 can be power-reset. That is, the power distribution unit 22 can restart the power-on procedure of the abnormal electronic device 24. In this way, if any one of the electronic devices 24 is abnormal or malfunctioned, it is not necessary to request the operator to go to the data center to find out the abnormal or malfunctioned electronic device among numerous cabinets and electronic devices. This can simplify the complex procedure of using manpower to inspect problematic electronic device, and regulate the power supply of the power distribution unit 22 and the electronic device 24 connected therewith under different rush hour, load capacity and demands. Therefore, the overall power management of the remote power management system 21 can be more efficient, and the management cost and power supply cost can be greatly reduced. More advantageously, the energy consumption and carbonic emission can be reduced. In addition, when the power of the electronic device 24 is restated and the problematic electronic device 24 can not resume its normal operation, the position of the electric device 24 in the data center can be located rapidly by checking the ID code of the power supply unit recorded in the database 210, so that the repairer can fix or replace the problematic electronic device.

Figure 5:
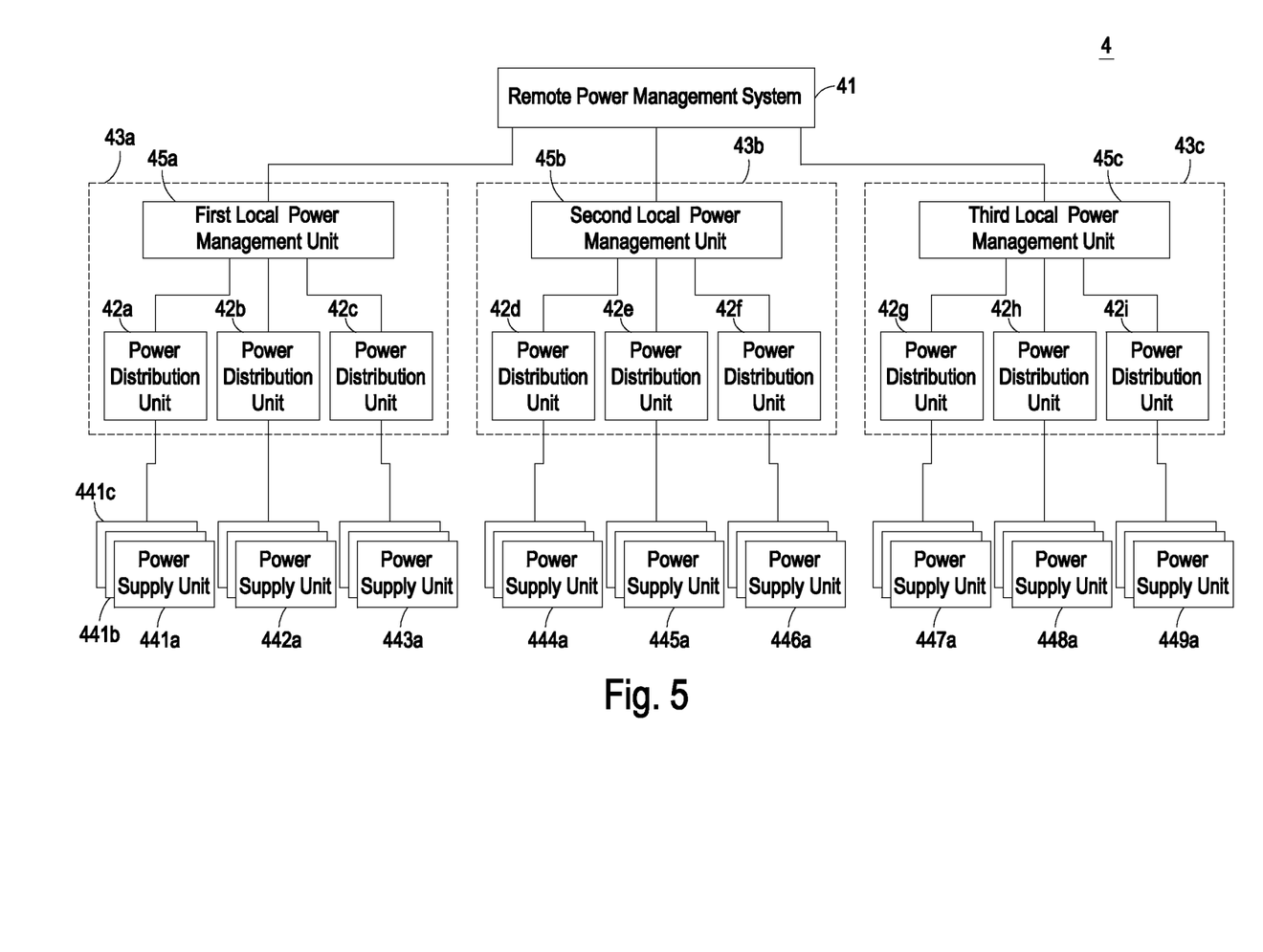
FIG. 5 is a block diagram of the active power management architecture according to another embodiment of the invention.

Referring to FIGS. 3 and 5, in which FIG. 5 is a block diagram of the active power management architecture according to another embodiment of the invention. FIG. 5 is different from FIG. 3 by that the active power management architecture 4 of FIG. 5 additionally includes at least one local power management unit 45a-45c. The power distribution units 42a-42i, the local power management units 45a-45c, and the remote power management system 41 of FIG. 5 can transmit data with each other by the internal data transmission channel. The mode of the data transmission and the mode of the power management among the power supply units 441a-449a, the power distribution units 42a-42i, the local power management units 45a-45c, and the remote power management system 41 of FIG. 5 are similar to the mode of the data transmission and the mode of the power management disclosed in the embodiment of FIG. 3, and it is not intended to give details to the mode of the data transmission and the mode of the power management among the power supply units 441a-449a, the power distribution units 42a-42i, the local power management units 45a-45c, and the remote power management system 41 of FIG. 5.

In this embodiment, each power supply unit 441a-449a is mounted in a corresponding electronic device (not shown). For example, the power distribution unit 42a is connected to the power supply units 441a, 441b, and 441c of the corresponding electronic device. That is, the outlets of the power distribution unit 42a are connected with three electronic devices, i.e. the power supply units 441a, 441b, and 441c. Likewise, other power distribution units 42b-42i are respectively connected to a corresponding power supply unit 442a-449a. Each power distribution unit 42a-42i is connected to a corresponding local power management unit 45a-45c. In this embodiment, the remote power management system 41 is used to manage three local power management units 45a-45c. The first local power management unit 45a is connected to three power distribution units 42a-42c. The second local power management unit 45b is connected to three power distribution units 42d-42f. The third local power management unit 45c is connected to three power distribution units 42g-42i. It is to be noted that the arrangement and the number of the local power management units, the power distribution units, and the power supply units may not be limited to the precise form disclosed herein.

Figure 6:
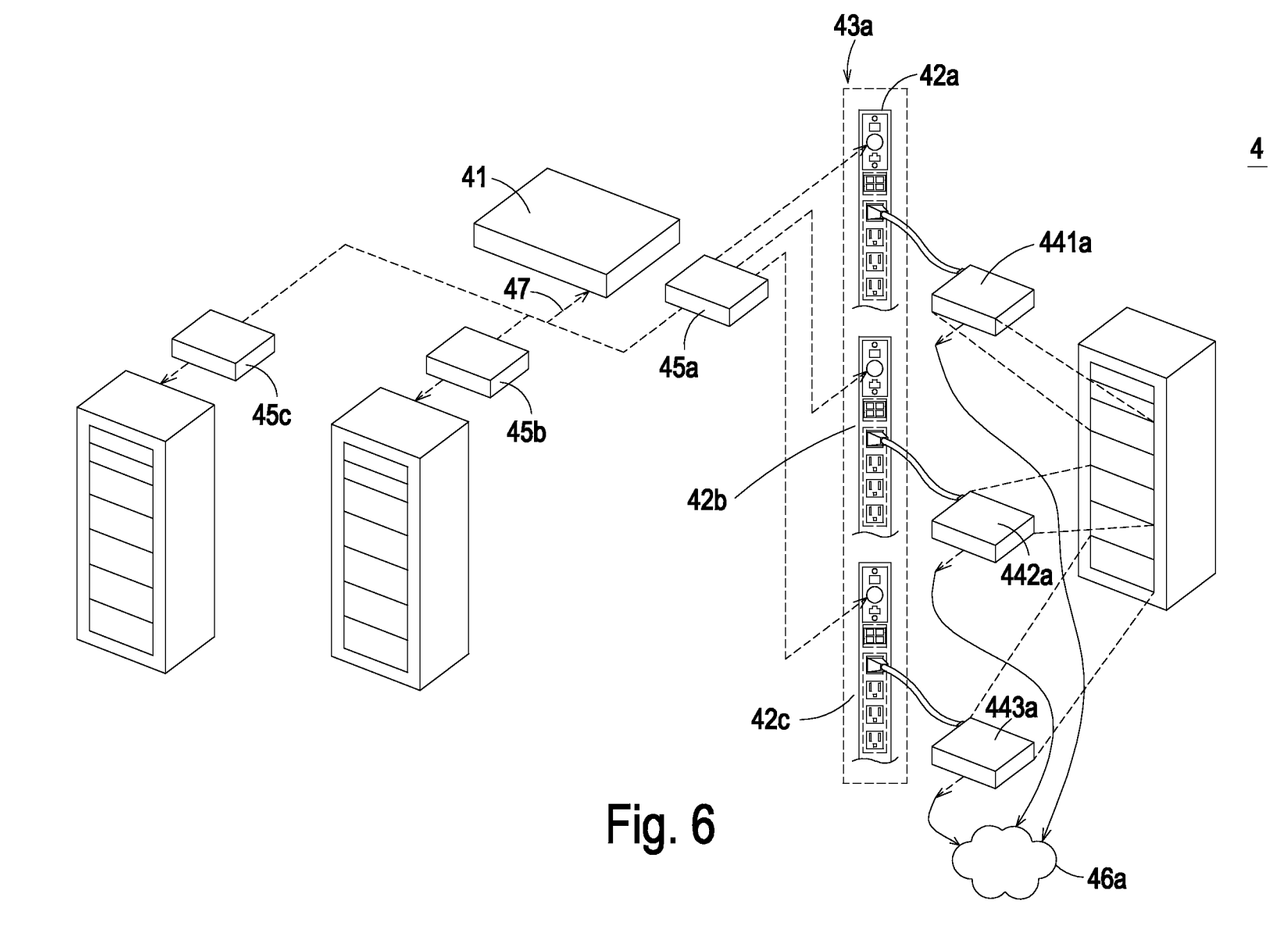
FIG. 6 shows the systematic architecture of the active power management architecture of FIG. 5.

Referring to FIGS. 6 and 5, in which FIG. 6 shows the systematic architecture of the active power management architecture of FIG. 5. In this embodiment, the power management system 4 includes a first local power management unit 45a, a second local power management unit 45b, and a third local power management unit 45c. The power distribution units are grouped into a first power distribution unit group 43a, a second power distribution unit group 43b, and a third power distribution unit group 43c. The power distribution units 42a, 42b, 42c in the first power distribution unit group 43a are conglomerated and contact with the first local power management unit 45a for being managed and controlled locally by the first local power management unit 45a. as the first local power management unit 45a has a proprietary and unique IP address and all the power distribution units 42a, 42b, 42c has a proprietary and unique IP address, and power distribution units 42a, 42b, 42c are configured to transmit data with the remote power management system 41 via their proprietary and unique IP address through the first local power management unit 45a. Likewise, the power distribution units in the second power distribution unit group 43b are conglomerated and contact with the second local power management unit 45b, so that all the power distribution units 42d, 42e, 42f have a proprietary and unique IP address. Likewise, the power distribution units in the third power distribution unit group 43c are conglomerated and contact with the third local power management unit 45c, so that all the power distribution units 42g, 42h, 42i have a proprietary and unique IP address.

The first local power management unit 45a, the second local power management unit 45b, and the third local power management unit 45c can contact the remote power management system 41 directly through the internal network 47 by a network communication protocol. When the network interface of the remote power management system 41 is transmitting/receiving communication data, instruction or message to/from the first local power management unit 45a, the second local power management unit 45b, and the third local power management unit 45c, it is required that each local power management unit 45a, 45b, 45c has an unique IP address for operation, instead of requesting each power distribution unit 42a-42i to have an IP address for operation. In this way, the first local power management unit 45a, the second local power management unit 45b, and the third local power management unit 45c can be used to communicate with the conventional power distribution units.

Besides, each power distribution unit 42a-42i includes one or more outlets and sensors. Each outlet allows an electronic device to be plugged therein, and the electronic device includes a power supply unit 441a-449a. The sensor is used to indicate the real-time voltage of the outlet and the current flowing through the outlet, thereby detecting the voltage and current of each power supply unit 441a-449a. Each power distribution unit 42a-42i can transmit the operation information and power consumption information of each outlet to the corresponding local power management unit 45a, 45b, 45c.

The first local power management unit 45a is allowed to use the resources of the first power distribution unit group 43a real-timely, including the power distribution units, the power supply units, the battery racks, sensors, and human management interfaces (HMIs). Likewise, the second local power management unit 45b is allowed to use the resources of the second power distribution unit group 43b real-timely, including the power distribution units, the power supply units, the battery racks, sensors, and human management interfaces (HMIs).

In this embodiment, the power distribution units 45a-45c may be power distribution units without wireless network connectivity, and is allowed to connect to the internal communication interface of the first local power management unit 45a through a wired communication interface. The internal communication interface of the first local power management unit 45a may be a serial communication interface compliant with EIA standards (such as RS-232 interface, RS-499 interface, RS-423 interface, RS-485 interface), a controller area network (CAN-bus) interface, an IEEE 1394 interface, a Bluetooth interface, a Fiber Channel interface, an Infiniband interface, or an Ethernet interface.

In other words, the active power management architecture 4 can control the power distribution units 42a-42i by the local power management units 45a-45c. Also, the local power management units 45a-45c can transmit the status information of the power-consuming elements connected to the power distribution units with each other. The power-consuming elements connected to the power distribution units may be power supply units, battery racks, sensors, and human management interfaces. Thus, the remote power management system 41 can accomplish a local power management scheme to control the power supply units in different areas.

In this embodiment, the remote power management system 41 can transmit a corresponding setting file to each local power management unit 45a-45c to allow each local power management unit 45a-45c to control the power distribution units 42a-42i according to the management strategy or/and policy in the setting file. In other words, the active power management architecture 4 can accomplish a local power management scheme by using the controller of each local power distribution unit 45a-45c to control the power distribution operation through the Ethernet interface and non-Ethernet interface.

Figure 7:
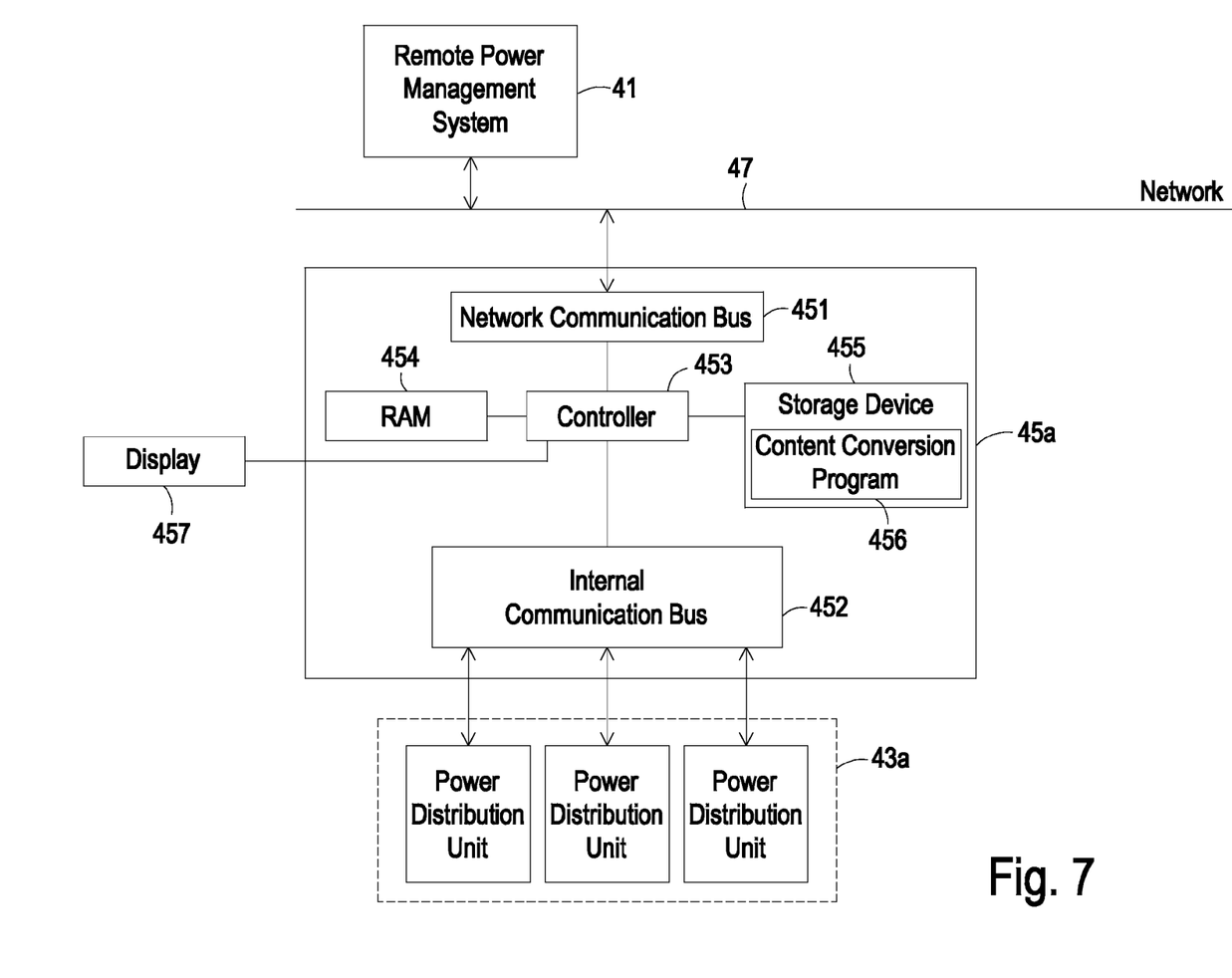
FIG. 7 is a block diagram showing the first local power management unit of FIG. 6.

FIG. 7 is a block diagram showing the first local power management unit of FIG. 6. As shown in FIG. 7, the first local power management unit 45a includes a network communication bus 451, an internal communication bus 452, a controller 453, a random access memory (RAM) 454, and a storage device 455. The network communication bus 451 is connected to the remote power management system 41 through the internal network 47. The internal communication bus 452 is configured to communicate with the first power distribution unit group 43a. In practical applications, the internal communication bus 452 may include various communication interfaces, including USB interface, RS-232 interface, RS-499 interface, RS-423 interface, RS-422 interface, RS-485 interface, CAN-bus interface, IEEE 1394 interface, Bluetooth interface, Fiber Channel interface, Infiniband interface, or Ethernet interface. The controller 453 is connected to the RAM 454, the network communication bus 451, the storage device 455, and the internal communication bus 452 for collecting, analyzing, accumulating, and integrating power consumption information. Thus, the workload in connection with the management task or the program processing of the remote power management system 41 is alleviated. Furthermore, the controller 453 can deliver an instruction to the first power distribution unit group 43a for adjusting the power consumption of the first power distribution unit group 43a according to the operation policy setting file stored in the storage device 455. The storage device 455 is configured to store the operation policy setting file, which is indicative of the setting patterns of the first power distribution unit group 43a. The operation policy setting file is downloaded from the remote power management system 41 to the first local power management unit 45a through the internal network 47. It is noteworthy that the network communication bus 451 can be implemented by an Ethernet network interface. The storage device 455 may be used to store the operation information or the power consumption of the first power distribution unit group 43a. The RAM 454 is configured to provide a buffer space for the controller to store the computational data required for the controller 453.

Furthermore, the first local power management unit 45a further includes an external display 457 for displaying the operation information or power consumption information of the first power distribution unit group 43a. In practical applications, the external display 457 can be a LED panel or a LED panel. Also, the storage device 455 includes a content conversion program for converting the information received from the first power distribution unit group 43a into appropriate IP data packets, which is in turn transmitted to the remote power management system 41 through the internal network 47.

In conclusion, the inventive active power management architecture uses the internal network and the two-way communication channel set up on transmission cables as well as the power line communication technique to obtain the power consumption information of the power distribution units and the power supply units of the corresponding electronic devices. The inventive active power management architecture can compare and analyze the information to make determinations and response, thereby giving instructions to the power distribution units. The power distribution units are configured to manage and control the electronic devices according to the instructions. Also, different local power management units are linked with each other for communication. Thus, the remote power management system can rapidly and efficiently obtain the real-time power consumption information by the internal network communication and transmission cables without the constraints of the transmission time and transmission quantity on the external network. When the internal network is a wireless network, the cabinet hosting the electronic devices and power distribution units can be placed anywhere in the data center without being limited by the layout of the network wires. The designer can increase the number of the power distribution units without causing problems or increasing the cost.

Furthermore, the inventive active power management architecture can access the information more conveniently and stably, and can position each electronic device according to the physical locations of the electronic devices. Besides, the remote power management system can actively adjust the local power distribution or power management operation according to the power consumption information obtained by the internal network communication. Thus, the overall power management efficiency and stability are improved, and the cost involved with power management is reduced.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An active power management architecture, comprising:
a remote power management system having a database;
at least one power distribution unit having an internal network communication device for directly communicating with the remote power management system through an internal network;
a plurality of electronic devices, each of which includes a power supply unit;
a network management system connected to and communicated with the electronic devices through a first external network, and the network management system is connected to and communicated with the remote power management system through a second external network; and
a plurality of transmission cables respectively connected to the at least one power distribution unit and the power supply units of the electronic devices for outputting power of the at least one power distribution unit to the power supply units;
wherein information of the power supply units is transmitted from the power supply units to the at least one power distribution unit through the transmission cables in compliance with a power line communication protocol, the information including an ID code of each of the power supply units, and the at least one power distribution unit is configured to transmit the information to a database of the remote power management system over the internal network thereby facilitating rapid and efficient acquisition of the information by the remote power management system without employing the first and second external networks, wherein the remote power management system gives instructions to the at least one power distribution unit over the internal network to control the at least one power distribution unit and the power supply units such that the at least one power distribution unit and the power supply units can be controlled by the remote power management system over the internal network in addition to over the first and second external network, at least some of the instructions including the ID code of the power supply unit to which the instruction applies.

2. The active power management architecture according to claim 1 wherein the transmission cables are bi-directional transmission cables.

3. The active power management architecture according to claim 1 wherein the at least one power distribution unit includes a plurality of outlets for allowing the electronic devices to be plugged therein through the transmission cables, thereby connecting the at least one power distribution unit and the electronic devices.

4. The active power management architecture according to claim 3 wherein the information further includes network addresses of the electronic devices, input voltages of the power supply units, input currents of the power supply units, and power consumptions of the power supply units.

5. The active power management architecture according to claim 4 wherein the remote power management system is configured to position the electronic devices according to the ID code of the power supply units.

6. The active power management architecture according to claim 1 further comprising a plurality of local power management units and a plurality of power distribution units, and wherein the remote power management system, the power distribution units, and the local power management units are linked with each other for communication, thereby allowing the remote power management system to actively control the power distribution units.

7. An active power management method, comprising the steps of:
(a) providing a remote power management system, at least one power distribution unit, a plurality of electronic devices, a network management system, and a plurality of transmission cables, wherein the at least one power distribution unit has an internal network communication device and is connected to a plurality of power supply units of the electronic devices through the transmission cables, the network management system connected to and communicated with the electronic devices through a first external network, and the network management system is connected to and communicated with the remote power management system through a second external network;
(b) transmitting information of the power supply units from the power supply units to the at least one power distribution unit through the transmission cables in compliance with a power line communication protocol, the information including an ID code for each of the power supply units;
(c) transmitting the information directly from the internal network communication device of the at least one power distribution unit to a database of the remote power management system through an internal network thereby facilitating rapid and efficient acquisition of the information by the remote power management system without employing the first and second external networks;
(d) actively giving instructions over the internal network to the at least one power distribution unit by the remote power management system according to the information, such that the at least one power distribution unit and the power supply units can be controlled by the remote power management system over the internal network in addition to over the first and second external network, at least some of the instructions including the ID code of the power supply unit to which the instruction applies; and
(e) in response to the instructions, controlling and managing the power supply units of the electronic devices.

8. The active power management method according to claim 7 wherein the transmission cables are bi-directional transmission cables.

9. The active power management method according to claim 7 wherein the at least one power distribution unit includes a plurality of outlets for allowing the electronic devices to be plugged therein through the transmission cables, thereby connecting the at least one power distribution unit and the electronic devices.

10. The active power management method according to claim 7 wherein the information further includes the network address of the electronic devices, the input voltage of the power supply units, the input current of the power supply units, or the power consumption of the power supply units.

11. The active power management method according to claim 7 wherein the step (a) further includes the step of:
providing a plurality of local power management units and a plurality of power distribution units, wherein the remote power management system, the power distribution units, and the local power management units are linked with each other through the internal network for communication, and the remote power management system is configured to actively control the power distribution units.

12. An active power management architecture, comprising:
a remote power management system having a database;
a plurality of power distribution units having an internal network communication device;
at least one local power management unit directly connected to the remote power management system through an internal network and connected to the power distribution units for performing a local power management and control operation;
a plurality of electronic devices, each of which includes a power supply unit;
a network management system connected to and communicated with the electronic devices through a first external network, and the network management system is connected to and communicated with the remote power management system through a second external network; and
a plurality of transmission cables respectively connected to the power distribution units and the power supply units of the electronic devices for outputting power of the power distribution units to the power supply units;
wherein information of the power supply units is transmitted from the power supply units to the power distribution units through the transmission cables in compliance with a power line communication protocol, the information including an ID code of each of the power supply units, and the power distribution units are configured to transmit the information to the database of the remote power management system through the at least one local power management unit thereby facilitating rapid and efficient acquisition of the information by the remote power management system without employing the first and second external networks, wherein the remote power management system gives instructions to the power distribution units via the local power management unit to control the power distribution units and the power supply units such that the at least one power distribution unit and the power supply units can be controlled by the remote power management system over the internal network in addition to over the first and second external network, at least some of the instructions including the ID code of the power supply unit to which the instruction applies.

13. The active power management architecture according to claim 12 wherein the power distribution units includes a plurality of outlets for allowing the electronic devices to be plugged therein through the transmission cables, thereby connecting the power distribution units and the electronic devices.

14. The active power management architecture according to claim 13 wherein the information further includes the network address of the electronic devices, the input voltage of the power supply units, the input current of the power supply units, or the power consumption of the power supply units.

15. The active power management architecture according to claim 14 wherein the remote power management system is configured to position the electronic devices according to the ID code of the power supply units.

16. The active power management architecture according to claim 12 wherein the at least one local power management unit includes a network communication bus, an internal communication bus, a controller, a random access memory, and a storage device, and wherein:
the at least one local power management is connected to the remote power management system through the internal network, and connected to the power distribution units through the internal communication bus and the transmission cables, and wherein the at least one local power management is configured to control the power distribution units connected therewith according to a management policy or/and management principle recorded in a setting file.

* * * * *